No. 878,786. PATENTED FEB. 11, 1908.
G. W. DUNHAM.
SPEED CONTROLLING MECHANISM FOR MOTOR VEHICLES.
APPLICATION FILED MAR. 18, 1907.
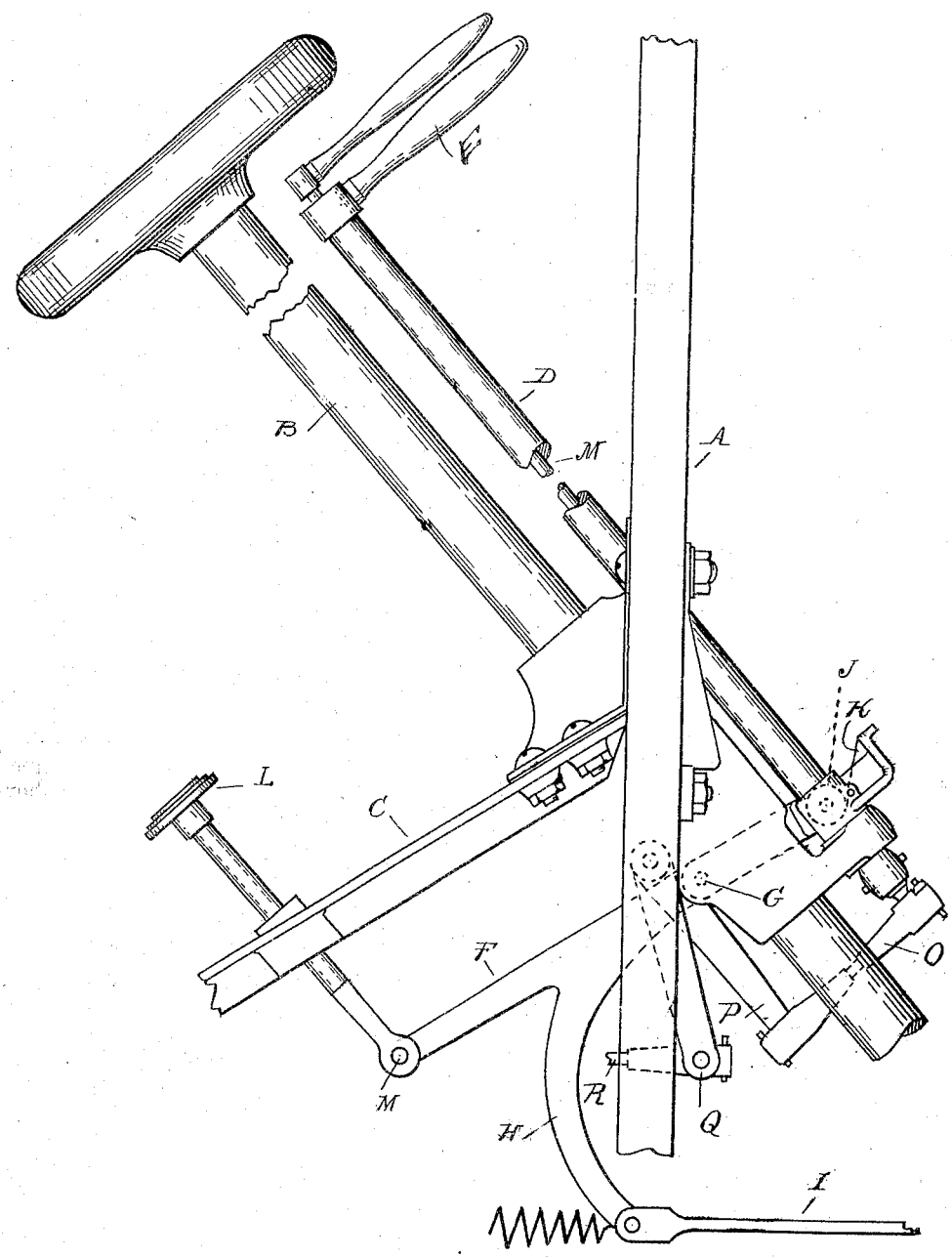

UNITED STATES PATENT OFFICE.

GEORGE W. DUNHAM, OF LANSING, MICHIGAN, ASSIGNOR TO OLDS MOTOR WORKS, OF LANSING, MICHIGAN, A CORPORATION OF MICHIGAN.

SPEED-CONTROLLING MECHANISM FOR MOTOR-VEHICLES.

No. 878,786.　　　Specification of Letters Patent.　　　Patented Feb. 11, 1908.

Application filed March 18, 1907. Serial No. 362,904.

*To all whom it may concern:*

Be it known that I, GEORGE W. DUNHAM, a citizen of the United States of America, residing at Lansing, in the county of Ingham and State of Michigan, have invented certain new and useful Improvements in Speed-Controlling Mechanism for Motor-Vehicles of which the following is a specification, reference being had therein to the accompanying drawings.

It is the object of the invention to provide means whereby the throttle of an engine may be set so as to drive the vehicle at a certain speed, and also to provide means whereby the speed may be at any time temporarily accelerated and returned again to the normal rate for which the throttle is adjusted.

To this end, the invention consists in a throttle controlling mechanism comprising two separately operable devices, the one controlling the throttle through its entire range of adjustment, and the other controlling merely an adjustment beyond the point at which the first controlling device is set; that is, the throttle may be further opened by the second controlling device, but cannot be closed beyond the point determined by the setting of the first controlling device.

In the drawings, is illustrated in elevation, a steering stem, and connecting mechanism for a motor vehicle with which parts my improved controlling mechanism is associated.

A is the dash of a motor vehicle, B is the steering stem, and C the inclined portion for the foot-board upon which said stem is mounted.

D is a stem parallel to the steering stem B, and E is an arm or lever at the upper end of said stem D, by which it may be rocked into different positions of adjustment.

F is a lever fulcrumed at G beneath the foot-board, and having an arm H connected by a rod I to the throttle (not shown). The opposite arm of the lever F extends adjacent to the stem D, and is provided with a bearing, preferably a roll J, which engages a cam bearing K attached to the stem D. This cam, when adjusted by the rotation of the stem, will shift the lever F, and through the rod I adjust the throttle, but in each intermediate position of adjustment said lever F is capable of a further movement, that is, it can be rocked out of contact with the cam J.

For effecting this further and independent adjustment of the lever F, a foot actuated button, or push rod, L is arranged in a convenient location, and is preferably attached at M to the lever F. Thus, the operator, having first set the cam K by an adjustment of the lever E, so as to give the desired degree of opening to the throttle, may at any time further open the throttle by pressing upon the button L. As soon as the pressure is relieved, the lever F is returned by a suitable means, diagrammatically illustrated, as a spring N, attached to the arm H, the cam K operating as a stop to limit the return movement.

From the description above given, it will be understood that the lever F controls the throttle through its entire range of adjustment, but the button L is merely an accelerator, the parts always returning after its operation to the point of adjustment previously determined by the setting of the lever E.

The rotary stem D may be associated with a concentric stem M, preferably passing centrally therethrough, and employed for adjusting the sparking mechanism. This stem is connected by means of a suitable lever system O, P and Q with a connecting rod R leading to the sparker, (not shown).

What I claim as my invention is:

1. A controlling mechanism for motor vehicles, comprising a hand-operated rock shaft, a cam mounted thereon, a throttle-actuating lever having a bearing at one end thereof upon said cam, a foot operated device for independently actuating said lever to separate the same from said cam, and yieldable means for returning said lever and pressing the same against said cam.

2. A controlling mechanism for motor vehicles, comprising a hand-operated rock stem, the cam K mounted thereon, the lever F having one arm thereof bearing against said cam, and another arm connected for actuating the throttle and the foot push rod L connected to said lever, substantially as, and for the purpose set forth.

In testimony whereof I affix my signature in presence of two witnesses.

GEORGE W. DUNHAM.

Witnesses:
　CHAS. D. HASTINGS,
　F. C. HILL.